(12) United States Patent
Darmody

(10) Patent No.: US 7,448,463 B1
(45) Date of Patent: Nov. 11, 2008

(54) MOTORCYCLE EXHAUST GUARD SYSTEM

(76) Inventor: Timothy Aaron Darmody, 10600 SE. Pardee, Portland, OR (US) 97266

( * ) Notice: Subject to any disclaimer, the term of this patent is extended or adjusted under 35 U.S.C. 154(b) by 568 days.

(21) Appl. No.: 11/211,326

(22) Filed: Aug. 24, 2005

(51) Int. Cl.
*B60K 13/04* (2006.01)
(52) U.S. Cl. .................. 180/309; 180/296; 181/227
(58) Field of Classification Search ........... 180/309, 180/296; 181/227, 228; D12/110, 114, 126, D12/194
See application file for complete search history.

(56) References Cited

U.S. PATENT DOCUMENTS

| | | | |
|---|---|---|---|
| 6,438,949 B1 * | 8/2002 | Nozaki | 60/322 |
| D463,328 S * | 9/2002 | Sawabe | D12/126 |
| 7,156,199 B2 * | 1/2007 | Takano | 180/309 |
| 7,318,497 B2 * | 1/2008 | Okunosono | 181/227 |
| 7,320,378 B2 * | 1/2008 | Inaoka et al. | 180/225 |
| 2005/0081516 A1 * | 4/2005 | Inaoka et al. | 60/324 |

FOREIGN PATENT DOCUMENTS

GB          2396185 A   *   6/2004

* cited by examiner

*Primary Examiner*—Paul N. Dickson
*Assistant Examiner*—John D Walters
(74) *Attorney, Agent, or Firm*—Mark S. Hubert

(57) ABSTRACT

The present invention is a two part motorcycle exhaust guard that attaches to the front and rear sections of a motorcycle's exhaust can. The front guard is made of a set of cantilevered steel, metal or alloy plates that house an interchangeable polymer or composite wear pad on an outer surface thereof. The front guard is itself attached to the exhaust but is reinforced from forceful removal through the use of a retention strap. The rear guard is also adapted to house a wear pad and mounts on the rear of the exhaust can.

15 Claims, 4 Drawing Sheets

MOTORCYCLE EXHAUST GUARD SYSTEM

BACKGROUND OF THE INVENTION

The present invention relates to a extremely compact motorcycle exhaust guard to protect a motorcycle's exhaust system from damage when the motorcycle experiences an accident. Additionally, the guard serves to enhance the aesthetic appearance of the motorcycle with the customized "after market" look.

In the sport of motorcycle racing, extracting the most torque and power out of the engine and keeping the overall weight down is paramount. The lightweight components to accomplish this, like custom exhaust systems, are quite expensive. The most common motorcycle accidents, where the motorbike remains salvageable, involve the sliding of the motorbike along one of its sides. Since the exhaust system protrudes from one or both of the sides, the guard system acts as a buffer between the pavement and the motorcycle thus assuming most or all of the damage. Therein, lies the problem—to develop a lightweight, aesthetically appealing guard to protect the motorcycle exhaust system from damage in sliding accidents.

The prior art focuses on heavy, bulky protection devices mostly oriented for the general protection of street bikes. This invention specifically protects one of the more vulnerable, expensive and commonly damaged areas of a race motorcycle with a guard system that is lightweight and visual appealing. This invention utilizes a two piece front and rear, compact guard system that houses replaceable colored polymer pads that extend normally from the exhaust system to form a two point sliding surface to prevent damage to the exhaust system.

Henceforth, such an exhaust guard would fulfill a long felt need in the industry. This new invention utilizes a unique and novel configuration to overcome the aforementioned problems and accomplish this.

SUMMARY OF THE INVENTION

The general purpose of the present invention, which will be described subsequently in greater detail, is to provide a lightweight motorcycle exhaust guard system that is able to repeatedly withstand sliding accidents and add an aesthetic flair to the motorbike.

It has many of the advantages mentioned heretofore and many novel features that result in a new motorcycle crash protective device which is not anticipated, rendered obvious, suggested, or even implied by any of the prior art, either alone or in any combination thereof.

In accordance with the invention, an object of the present invention is to provide an improved motorcycle exhaust guard capable of providing protection in repeated accidents.

It is another object of this invention to provide an improved motorcycle exhaust guard with various colored, interchangeable wear pads.

It is a further object of this invention to provide a motorcycle exhaust guard that is small, lightweight and aesthetically appealing.

It is still a further object of this invention to provide for a motorcycle exhaust guard that under stress is able to defect and or deform slightly without damaging the exhaust system.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
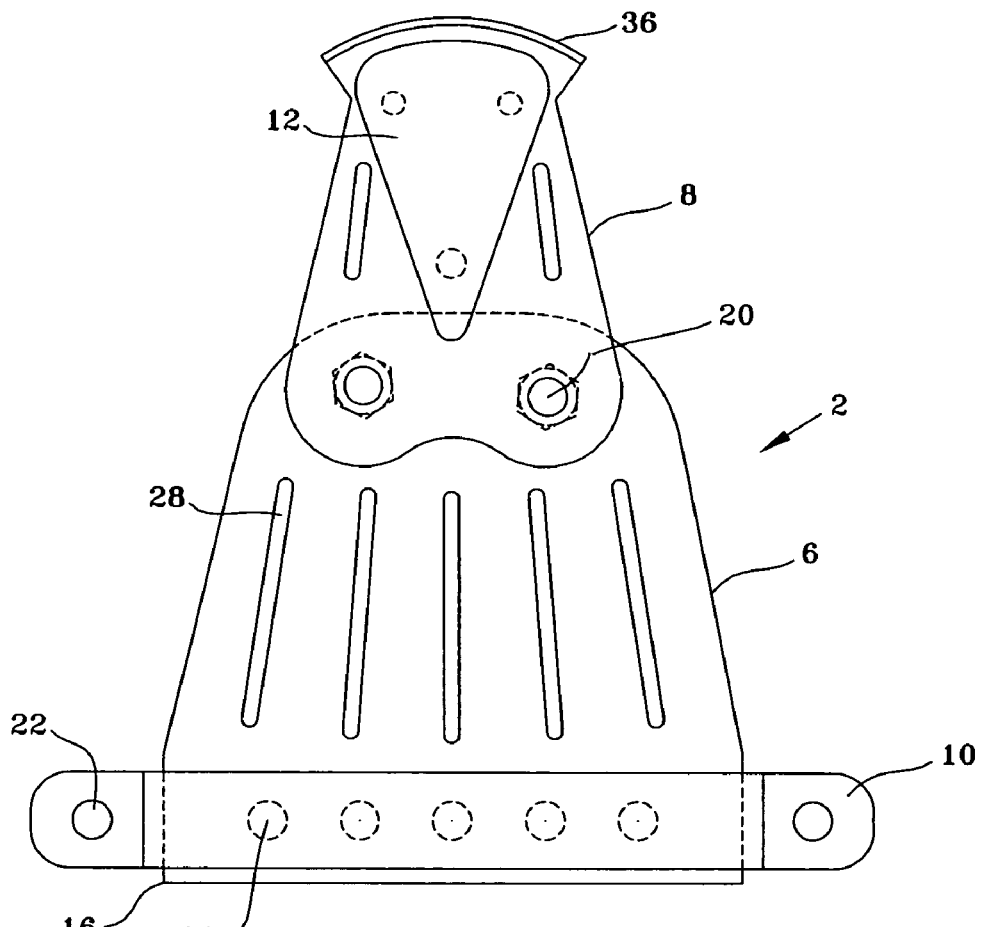
FIG. 1 is a top view of the front guard and strengthening strap without mechanical fasteners illustrated.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 11:
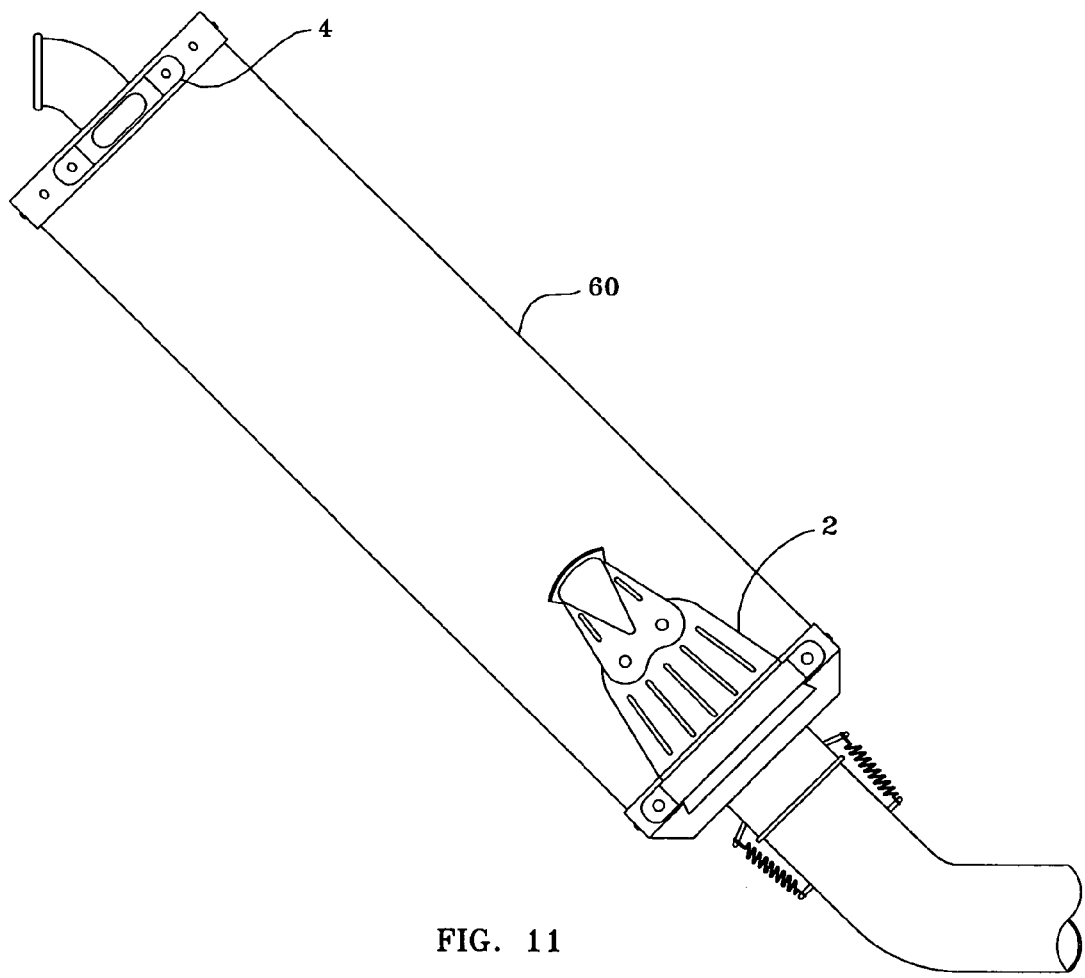
FIG. 11 is an illustrative view of the rear end of a motorcycle with the front and rear guards installed.

The part of the motorcycle targeted for protection is the exhaust pipe, commonly referred to as the exhaust can or muffler. The preferred embodiment of the present exhaust guard system has an front guard 2 and a rear guard 4. The upper guard assembly 2 is installed on the front end of an exhaust can 60 and the rear guard assembly 4 is installed on the rear end of an exhaust can 60. (See FIG. 11) The preferred method of mounting both assemblies is by the removal of some of the existing rivets about the perimeter of the exhaust can 60 and the alignment of the guard assemblies' orifices over the exposed rivet holes on the exhaust can 60 wherein new, deeper rivets can be installed therethrough. Although this is the preferred method of installation it is known that a plethora of other mechanical fasteners can be substituted for the rivets, depending upon the method of fabrication of the exhaust can 60. For example, self drilling, self tapping screws may be also be used.

Figure 2:
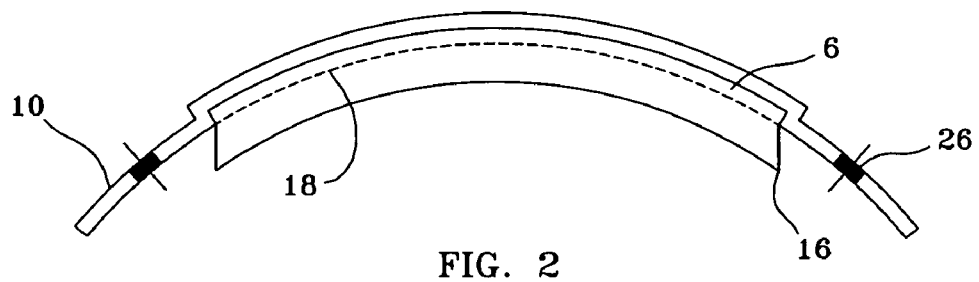
FIG. 2 is a cross sectional view of the front guard taken through the longitudinal centerline of the strengthening strap.
Figure 6:
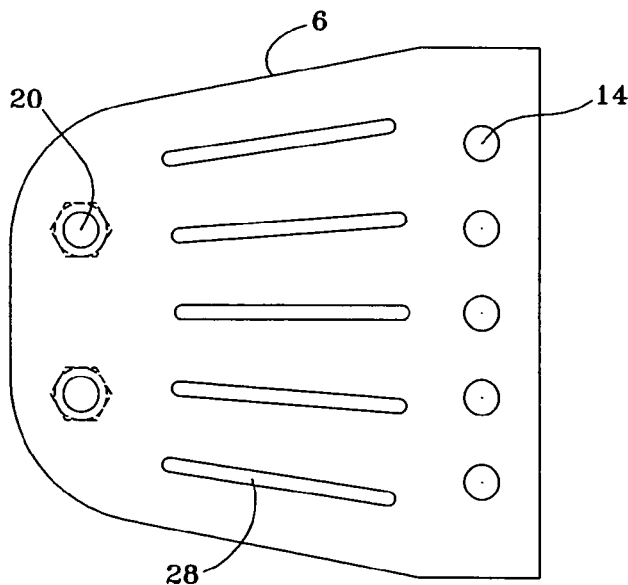
FIG. 6 is a top view of the lower plate of the front guard.

Referring to FIGS. 1 and 2, it can be seen that the front guard 2 has four parts; upper plate 8, lower plate 6, strengthening strap 10, pad 12 and various mechanical fasteners. Lower plate 6 is tapered and has a curved configuration that conforms to the radius of the exterior surface of a motorcycle exhaust can 60. This ranges from about two to four inches with the average being approximately three and one half inches. (This corresponds to an exhaust can 60 having a seven inch diameter.) Although made in a preferred embodiment radius of seven inches, it can be bent in situ to fit most any exhaust can 60. Lower plate 6, lies directly atop the outer surface of the exhaust can 60 and is mounted directly onto the can buy mechanical fasteners, passing through both the lower plate fastener orifices 14 located at the larger of the two ends 16 of this tapered plate and the resulting orifices in the exhaust can 60. Although there are five orifices 14 illustrated, there may be more or less of these incorporated into lower plate 6, depending upon the model of exhaust can 60 that it is to be connected to. At the edge of the larger tapered end 16 lower plate 6 is bent so as to taper inwards toward its radius of curvature. This bent lip 18 extends over the edge of the exhaust can 60 and gives additional strength to the front guard assembly 2 therein preventing it from being torn off in the event of a sliding accident. On the top surface of the smaller tapered end of lower plate 6 there are two threaded nuts 20 affixed. (Reference FIG. 6) Since the preferred embodiment of lower plate 6 is of steel, is most likely that the method of attachment of these nuts 20 will be by welded securement.

Figure 7:
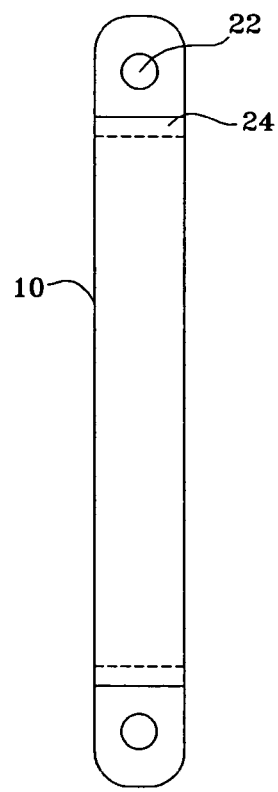
FIG. 7 is a top view of the strengthening strap.

Strengthening strap 10 is a curved linear strap having strap orifices 22 therethrough and located at either end. It is also affixed to the outer surface of the exhaust can 60 by mechanical fasteners such as rivets 26 in a similar fashion to that of lower plate 6. Strap 10 covers the mechanical fasteners through lower plate 6, thereby protecting both the fasteners and strengthening the general attachment of lower plate 6 to the exhaust can 60. Strap 10 has a bend 24 at either end to accommodate the thickness and configuration of lower plate 6. (Reference FIGS. 7 and 2) Lower plate 6 has first slots 28 milled therethrough running along the longitudinal axis of the plate for both weight reduction and aesthetical purposes.

Figure 5:
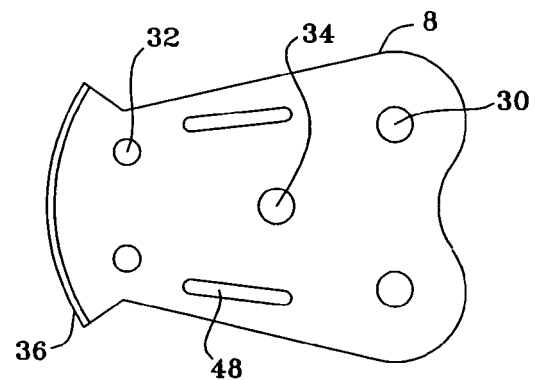
FIG. 5 is a top view of the upper plate of the front guard.

Upper plate 8 retains the same curvature as lower plate 6 and is also tapered. (Reference FIG. 9) The front end of upper plate 8 has two bolt passages 30 therethrough. Upper plate 8 resides in a staggered end cantilevered configuration above lower plate 6 such that when the front guard 2 is affixed to exhaust can 60, the upper plate 8 is above and in a spaced configuration with respect to the outer surface of the exhaust can 60. This allows for slight bending or deformation of this upper plate 8 without contact or damage to the exhaust can 60. The lower end of upper plate 8 has pad mounting orifices 32 therethrough. Centrally located on upper plate 8 is first mounting fastener orifice 34. (Ref. FIG. 5) The lower end of the upper plate 36 is bent upward and normal to the longitudinal axis of the exhaust can 60 so as to strengthen pad 12 from tearing off of upper plate 8 in the event of a sliding accident.

Figure 10:
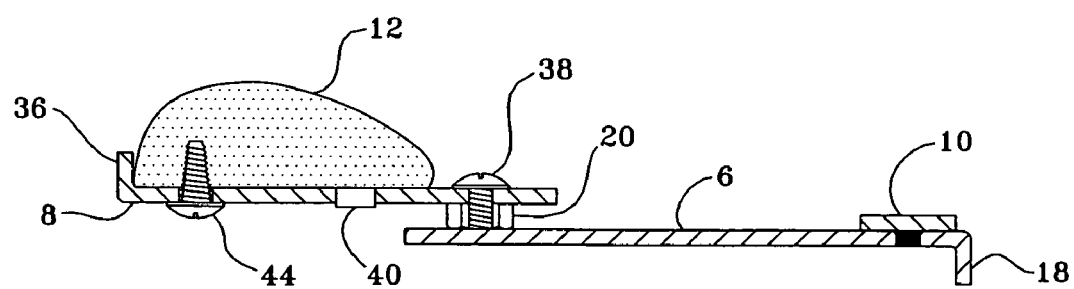
FIG. 10 is a cross sectional view of the upper guard taken through the longitudinal centerline of the upper guard.

Referring to FIG. 10 it can be seen that first mechanical faster 38 passes through upper plate 8 and threadingly engages with nut 20 on lower plate 6 to secure these plates together, forming the front guard assembly 2.

Figure 4:
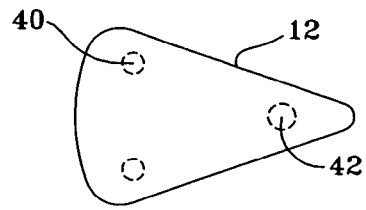
FIG. 4 is a top view of the front pad.
Figure 3:
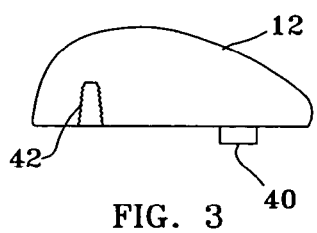
FIG. 3 is a cross sectional side view of the front pad.

Referring to FIGS. 3 and 4, the general configuration of the first pad 12 can be seen. It is best described as a half teardrop configuration. It has locating dowels 40 located at its bottom end for engagement in pad mounting orifices 32, and a stopped passage 42 at its top end. Referring again to FIG. 10, it is illustrated that stopped passage 42 may be threaded for engagement with a second mechanical fastener 44, such as a bolt, or it may be smooth for engagement with a screw. First pad 12 and second pad, 46 are both made from a resilient, abrasive resistance polymer that has a low coefficient of friction. Upper plate 8, also has second slots 48 milled therethrough running along the longitudinal axis of the plate for both weight reduction and aesthetical purposes. Similar to lower plate 6, upper plate 8 and strengthening strap 10 are fabricated from stainless steel, although there are numerous other metals and alloys as well as polymers that would work equally as well.

Figure 8:
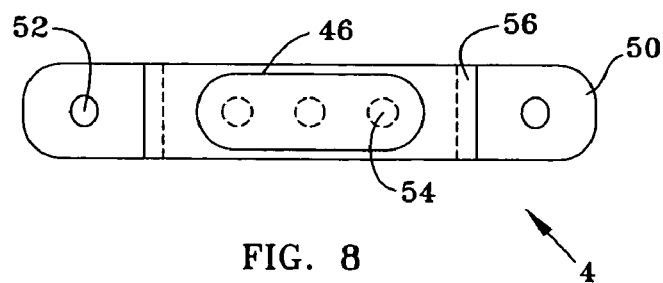
FIG. 8 is a top view of the rear guard without fasteners.
Figure 9:
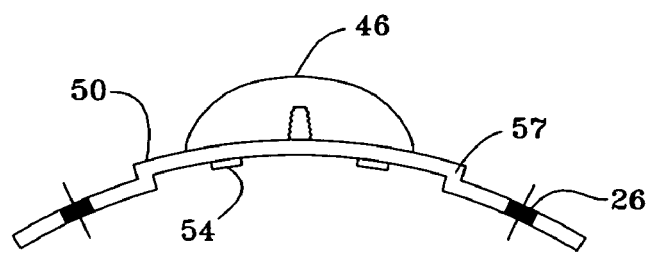
FIG. 9 is a side cross sectional view of the rear guard taken through it's longitudinal centerline.

Looking at FIGS. 8 and 9, rear guard 4 can be seen from above and in cross section. Rear guard 4 is made from guard strap 50 and second pad 46. Guard strap 50 is substantially similar to strengthening strap 10 in design and configuration. It has guard orifices 52 located at both it's ends that are adapted for receiving rivets 26 and it has an offset bend 57 at either end to accommodate the attachment mechanism of second pad 46 and to allow some deformation of guard strap 50 in the event of a sliding accident, without damaging the exhaust can 60. Guard strap 50 also has second pad mounting orifices 52 for receiving and frictionally retaining second pad location dowels 56. It is known that an alternative method of attachment mechanism would be by removal of location dowels 56 and insertion of a mechanical fastener, such as a screw. Mounting of rear guard 4 is accomplished in a similar fashion to the mounting of strengthening strap 10. Existing rivets on the exhaust can 60 would be removed and new longer rivets would be used to secure Guard strap 50 to the exhaust can 60.

In operation, once installed, the combination of the guards serve to provide two raised sliding points that extend perpendicular to the longitudinal axis of the exhaust can 60. In this manner, a minimal amount of damage, if any all, would be inflicted upon the exhaust can 60 of a motorcycle in the event of a sliding accident. The sliding pads are made in a variety of colors to match the motorcycle they go on. As can be seen from the design these pads are interchangeable and replaceable.

In the preferred embodiment of the guard system the lower plate 6 is approximately 3 inches long and 4 inches wide at the top end tapering down to approximately 2 and ⅞ inches. The upper plate 8 is approximately 2 and ⅞ inches wide at the top end tapering down to approximately 2 inches at the lower end. There is approximately 1 and ⅛ inches of overlap between the lower plate 6 and the upper plate 8. The first and second pad are approximately 1 and ¼ inches high. The rear guard 4 is approximately 6 inches long.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A motorcycle exhaust guard system comprising:
   a front guard for mounting by at least one mechanical fastener onto to an outer surface of a front end of an exhaust can; and
   a rear guard for mounting by at least one mechanical fastener to an outer surface of a rear end of said exhaust can, wherein said front guard and said rear guard are curved to conform to a contour of said exhaust can and have abrasive resistant, resilient polymer pads extending normally therefrom that extend perpendicular to a longitudinal axis of said can, and wherein said front guard is formed from a lower plate which is mechanically fastened to said can, and an upper plate mechanically affixed to said lower plate, and that houses said pad on an outer surface thereof, and wherein said plates are configured in a layered, staggered configuration such that said upper plate is in a cantilevered configuration with respect to said lower plate, and resides above said outer surface of said can.

2. The motorcycle exhaust guard system of claim 1 further comprising a strengthening strap covering said lower plate mechanical fasteners and mounted to the front of said outer surface of said exhaust can by at least two mechanical fasteners, wherein a longitudinal axis of said strap resides normally to a longitudinal axis of said lower plate.

3. The motorcycle exhaust guard of claim 2 wherein said lower plate has a front end and a rear end and an upper surface and a lower surface, wherein said front end of said lower plate has at least one orifice therethrough to accommodate said mechanical fasteners, and a bent edge extending at an acute angle therefrom with respect to said longitudinal axis of said lower plate, and wherein said rear end has at least one nut affixed to said upper surface thereof, and wherein said lower surface is in contact with said outer surface of said exhaust can.

4. The motorcycle exhaust guard of claim 3 wherein said upper plate has a front end and a rear end and an upper surface and a lower surface, wherein said front end of said upper plate has at least one orifice therethrough to accommodate a bolt adapted for threaded engagement with said nut, and wherein said pad is removably affixed to said upper surface of said rear end.

5. The motorcycle exhaust guard of claim 4 wherein said rear end of said upper plate has an edge extending upward therefrom and adapted for retention of said pad.

6. The motorcycle exhaust guard of claim 2 wherein said mechanical fasteners securing said front guard and said rear guard to said exhaust can are rivets.

7. The motorcycle exhaust guard of claim 2 wherein said mechanical fasteners securing said front guard and said rear guard to said exhaust can are screws.

8. The motorcycle exhaust guard of claim 5 wherein said plates, said retaining band, and said strap are fabricated from steel.

9. The motorcycle exhaust guard of claim 6 wherein said pads are replaceable.

10. The motorcycle exhaust guard of claim 5 wherein said plates, said retaining band, and said strap are fabricated from an alloy.

11. The motorcycle exhaust guard of claim 5 wherein said plates, said retaining band, and said strap are fabricated from a metal.

12. The motorcycle exhaust guard of claim 5 wherein said plates, said retaining band, and said strap are fabricated from a polymer.

13. A guard system adapted to provide protection to a motorcycle exhaust can in the event of a sliding accident comprising:
    a front guard affixed to the front end of an exhaust can; and
    a rear guard affixed to the rear end of an exhaust can;
    wherein said front guard and said rear guard have resilient polymer pads that project perpendicular to a longitudinal axis of said exhaust can, and wherein said front guard is riveted to a front end of said exhaust can and said rear guard is riveted to a rear end of said exhaust can.

14. The guard system of claim 13 further comprising a retaining strap that overlaps said front guard and is riveted to said front end of said exhaust can.

15. The guard system of claim 14 wherein said front guard and said rear guard are fabricated from stainless steel.

* * * * *